United States Patent
Ide

(10) Patent No.: US 6,253,816 B1
(45) Date of Patent: Jul. 3, 2001

(54) PNEUMATIC RADIAL TIRE WITH PARTICULAR BELT REINFORCING LAYER FIBER CORD AND PARTICULAR BEAD FILLER HEIGHT

(75) Inventor: Keita Ide, Tokyo (JP)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 08/899,208

(22) Filed: Jul. 23, 1997

(30) Foreign Application Priority Data

Jul. 24, 1996 (JP) ................................. 8-194937
May 26, 1997 (JP) ................................. 9-135473

(51) Int. Cl.[7] ................. B60C 9/20; B60C 9/22; B60C 15/00; B60C 15/06
(52) U.S. Cl. ................. 152/527; 152/531; 152/533; 152/541; 152/543; 152/546; 152/554
(58) Field of Search .................... 152/527, 531, 152/546, 554, 541, 543, 533

(56) References Cited

U.S. PATENT DOCUMENTS 5,526,863  * 6/1996 Hodges ........................... 152/546 X

FOREIGN PATENT DOCUMENTS

0542567A1  5/1993 (EP).
0749854A1  12/1996 (EP).

OTHER PUBLICATIONS

Patent Abstracts of Japan, Publication No. 04154410, dated May 27, 1992 (Sumitome Rubber Ind Ltd).
Patent Abstracts of Japan, Publication No. 06255305, dated Sep. 13, 1994 (Bridgestone Corp).
P.R. Rim, "The High Performance Properties of Pen Fibres in Tyre Reinforcement," Kautschuk Und Gummi—Kunstoffe, vol. 49, No. 6, Jun. 1996, pp. 418–423, XP 000598250.

* cited by examiner

*Primary Examiner*—Adrienne C. Johnstone
(74) *Attorney, Agent, or Firm*—Sughrue, Mion, Zinn, Macpeak & Seas, PLLC

(57) ABSTRACT

A belt reinforcing layer is disposed outwardly in the radial direction of a tire so as to reinforce the whole portion or the end portions of a tread portion. The belt reinforcing layer is formed by spirally winding a rubber-coated and narrow strip made of a fiber cord/cords around a tire. A pair of bead fillers are disposed directly above bead cores of a pair of bead portions. The cords of the belt reinforcing layer are made of organic fiber cords, and have a 2.7% or less elongation under load of 1.4g/d at the temperature of 50±5° C., and have a 1.5 to 6.0% elongation under load of 0.7g/d at the temperature of 170±5° C. The height L of each of the bead fillers corresponds to 20 to 60% of the cross sectional height T of a tire.

8 Claims, 2 Drawing Sheets

PNEUMATIC RADIAL TIRE WITH PARTICULAR BELT REINFORCING LAYER FIBER CORD AND PARTICULAR BEAD FILLER HEIGHT

BACKGROUND OF THE INVENTION

1. Field of the Invention

The present invention relates to a pneumatic radial tire in which excellent stability and controllability are provided and a large amount of road noise can be reduced 2. Description of the Related Art In recent years, since requirements for the sophistication of vehicles have been increasing, especially passenger cars, improvements of riding qualities have been proceeding. Therefore, as requirements for a tire, reduction of noise caused by a tire and higher riding qualities through a tire are needed.

It is especially desired that a large amount of noise which is caused at the interior of a vehicle can be reduced. In this case, improvement requirements for so-called "road noise" that is one of the above-described noises have been extremely increasing. Namely, road noise is caused by the tire during travel of a vehicle picking up irregularities on a road surface. The resultant vibration is conveyed to the interior of a vehicle, thereby causing the air to vibrate in the interior of the vehicle.

Further, simultaneously with the sophistication of vehicles, speed-up and/or power-up of vehicles also occurs. Accordingly, a tire for which only problems in riding qualities and road noises have been solved in the same manner as a conventional tire cannot comply with the aforementioned requirements. As a result, it is necessary to maintain a tire to a high level of speed resistance, uniformity performance, stability and controllability, and rolling resistance.

In a conventionally known method of reducing road noise, a method can be provided in which the entire portion or the widthwise direction end portions of a crossing belt layer is/are held by a reinforcing layer which is made of rubber-coated cords such as nylon cords which are disposed in the circumferential direction of a tire so that the rigidity of the aforementioned belt layer in the circumferential direction thereof can be reinforced.

In accordance with this method, a ribbon-shaped strip is formed by rubber-coating a nylon cord or a plurality of nylon cords which are disposed in parallel to each other, and is wound around a tire substantially in the circumferential direction thereof. A green tire to which a tread member unvulcanized is attached is vulcanized on the above resulting tire so that a tire as a product is manufactured.

However, a problem arises in that, because nylon cords generally show Young's modulus which is relatively low at the range of temperature depending upon the use conditions of a fire (a large elongation 4.2% was resulted under load of 1.4 g/d at the temperature of 50±5° C.), it is impossible to improve road noise to the desired level. Moreover, since nylon cords tend to generate a flat spot on a fire, especially in winter, when a vehicle runs after having been parked for a long time, abnormal vibration may be caused.

On the other hand, in the case of aromatic series polyamide fiber (alamide fiber from Dupont Co., Ltd.), since Young's modulus is high even at the vulcanized temperature of 170±5° C. (a small elongation 0.8% was resulted under load of 0.7 g/d at the temperature of 170±5° C.), when cords are disposed in parallel to each other in the circumferential direction of a tire, they are not elongated during the inflation and vulcanization of a tire. Accordingly, the angle formed between the cords and a crossing belt layer (especially, a belt layer which is made of steel cords) which is positioned inwardly in the radial direction of a tire, i.e., the angle formed at the time when a green tire is inflated due to an internal vulcanization pressure, can be prevented from being changed so that desirable angle changes cannot be provided. Further, it is difficult to provide an essential amount of gauge for the rubber between a belt reinforcing layer and a belt layer so that the upper and lower cords are kept in close contact with each other, thereby causing a separation failure to the tire. In an excessive case, the belt reinforcing layer and the belt layer are displaced from each other, thereby affecting the uniformity of a tire adversely. This causes problems in noise and stability and controllability of a tire.

SUMMARY OF THE INVENTION

In view of the aforementioned facts, it is an object of the present invention to provide a pneumatic radial tire in which excellent stability and controllability can be provided and a larger amount of road noise is reduced.

In accordance with the present invention, there is provided a pneumatic radial tire, comprising a pair of bead portions, a carcass having a toroid-shaped configuration and extending over the bead portions, a tread portion which is positioned at the crown portion of the carcass, and a pair of side wall portions, in which at least two belt layers are disposed inwardly from the tread portion, at least one belt reinforcing layer is disposed outwardly from the belt layer in the radial direction thereof at positions corresponding to the whole portion and/or the end portions of the tread portion, the belt reinforcing layer is formed by spirally winding a rubber-coated and narrow strip made of a single fiber cord or a plurality of fiber cords around a tire such that the fiber cord/cords are provided substantially in parallel to the circumferential direction of the tire, and a pair of bead fillers are disposed directly above bead cores of a pair of the bead portions, respectively, wherein the belt reinforcing layer is made of organic fiber cords, the fiber cord has a 2.7% or less elongation under load of 1.4 g/d at the temperature of 50±5° C., and has a 1.5 to 6.0% elongation under load of 0.7 g/d at the temperature of 170±5° C., the height of each of the bead fillers corresponds to 20 to 60% of the cross sectional height of a tire.

In accordance with the present invention, the fiber cords forming the belt reinforcing layer need to have a 1.5 to 6.0% elongation under load of 0.7 g/d at the temperature received by the fiber cord at the time of vulcanizing forming of a tire, i.e., 170±5° C. During forming of a tire, when a vulcanization forming die is inserted into a green tire, an internal pressure is filled in the green tire, and the green tire is pressed onto the internal surface of a forming die, it is important to keep respective portions of a tread, whose elongation is unfixed, in close contact with the forming die so that the tread elongates sufficiently. Therefore, the cords used to form the belt reinforcing layer made which is spirally wound around a tire should have an elongation 1.5 to 6.0% or the like which make a tread conform or applicable to a vulcanization forming die, thereby resulting in excellent vulcanization forming performance of a tire, uniform quality and status of a belt reinforcing layer, and uniform road holding. As a result, excellent reduction of road noise of a tire, higher stability and controllability, higher uniformity performance, and higher biased-abrasion resistance can be accomplished. Further, angle changes of the cords intersecting on a belt layer can be prevented so that the rubber gauge can be secured sufficiently between a belt reinforcing layer and the belt layer, and a separation failure is not thereby caused. The reason why an elongation under load of 0.7 g/d is employed for the belt reinforcing layer is because the average tensional force which is applied to a fiber cord of the belt reinforcing layer which is spirally wound around at the inside of the vulcanization mold is generally about 0.7 g/d. Assuming that the elongation is less than 1.5% as in the case of aromatic series polyamide fiber, such drawbacks arise in that a tread cannot elongate sufficiently within a vulcanization forming die, a successful vulcanization mold cannot be accomplished, road holding is not uniformed, road noise cannot be reduced effectively, thereby adversely effecting the stability and controllability of a tire. Further, in the case where the elongation is over 6.0%, after a tire has been removed from a vulcanization forming die, when the tire is filled with an internal pressure and is cooled (i.e., post cure inflation), the elongation of the tread portion in the circumferential direction of a tire increases, the initial modulus decreases, thereby making a hoop effect on the belt reinforcing layer decrease.

Moreover, according to the present invention, organic fiber cords of the belt fiber cord have an elongation of 2.7% or less under load of 1.4 g/d at the temperature received by the cords of the belt reinforcing layer at the normal traveling time of a tire, which is 50±5° C. Accordingly, vibrations of the belt due to irregularities on a road surface can be reduced. If the elongation is more than 2.7%, it is difficult to prevent the vibrations of the belt, so that road noise reduction effect cannot be accomplished.

In this way, it is preferable that the organic fiber cord has an elongation of 1.8% or less under load of 1.4 g/d at the temperature of 50±5° C. and has a 2.0 to 3.0% elongation under load of 0.7 g/d at the temperature of 170±5° C. It is also preferable that the organic fiber cord of the belt reinforcing layer has a slope Ni of a tangent of a stress-elongation curve indicated under load of 1.4 g/d at the temperature of 50±5° C., and has a slope N2 of a tangent thereof under load of 0.25 g/d at the same temperature, the ratio of Ni to N2 being 0.8 to 1.3. As a result, the vibration control on a belt layer can be maintained constant with respect to the vibration input of the belt so that irregularities are not caused.

It is preferable that the aforementioned organic fiber cord is formed such that more than 30% of the number of a total indication denier is constituted by polyethylene-2, 6-naththalate fiber (hereinafter, it is referred to as "PEN"), or is constituted by polyethylene telephthalate fiber cord.

Moreover, in the present invention, since a bead filler height corresponds to 20 to 60% of a tire cross sectional height, road noise can be reduced, and stability and controllability can be improved. If the height of each of the bead fillers is more than 60% of a tire cross sectional height, the volume of each bead filler increases, the rigidity thereof becomes excessive so that road noise increases. If the height of each of the bead fillers is less than 20% of a tire cross sectional height, the belt reinforcing layer requires rigidity so that the stability and controllability of a tire decrease.

It is preferable that each of the bead fillers is interposed between a carcass body and a carcass folding portion, of the carcass, a base portion disposed directly above each of the bead cores is tapered outwardly in the radial direction of a tire, and the bead filler extends at a substantially constant cross sectional width from the upper end portion of the base portion to the distal end portion of the bead filler. Therefore, a bead filler height can be obtained, excessive volume of the bead filler can be removed, and the entire volume thereof can be minimized. Accordingly, it is possible to optimize the rigidity of the bead filler, thereby complying with both road noise reduction and excellent stability and controllability. Especially, in combination with the aforementioned fiber cords of the belt reinforcing layer, road noise can be reduced more effectively.

In order to accomplish optimization of the rigidity of the bead portion, in a pneumatic radial tire according to the present invention, it is preferable that a bead reinforcing layer is disposed at a carcass folding portion outwardly in the widthwise direction of a tire such that the direction of cords forming the bead reinforcing layer inclines at the angle of 10° to 60° with respect to the radial direction of a tire. The height of the bead reinforcing layer corresponds to 20 to 60% of the cross sectional height of a tire. The height of the bead reinforcing layer is higher than the height of the bead filler. The height of the carcass folding portion corresponds to 15 to 40% of the cross sectional height of a tire and is lower than the height of the bead filler.

The above and other objects, features and advantages of the present invention will become apparent from the following description and the appended claims, taken in conjunction with the accompanying drawings in which preferred embodiments of the present invention are shown by way of illustrative example.

BRIEF DESCRIPTION OF THE DRAWINGS

The invention will now be described with reference to the accompanying drawings wherein.

DESCRIPTION OF THE PREFERRED EMBODIMENTS

A description of an embodiment according to the present invention will be given hereinafter.

Figure 1:
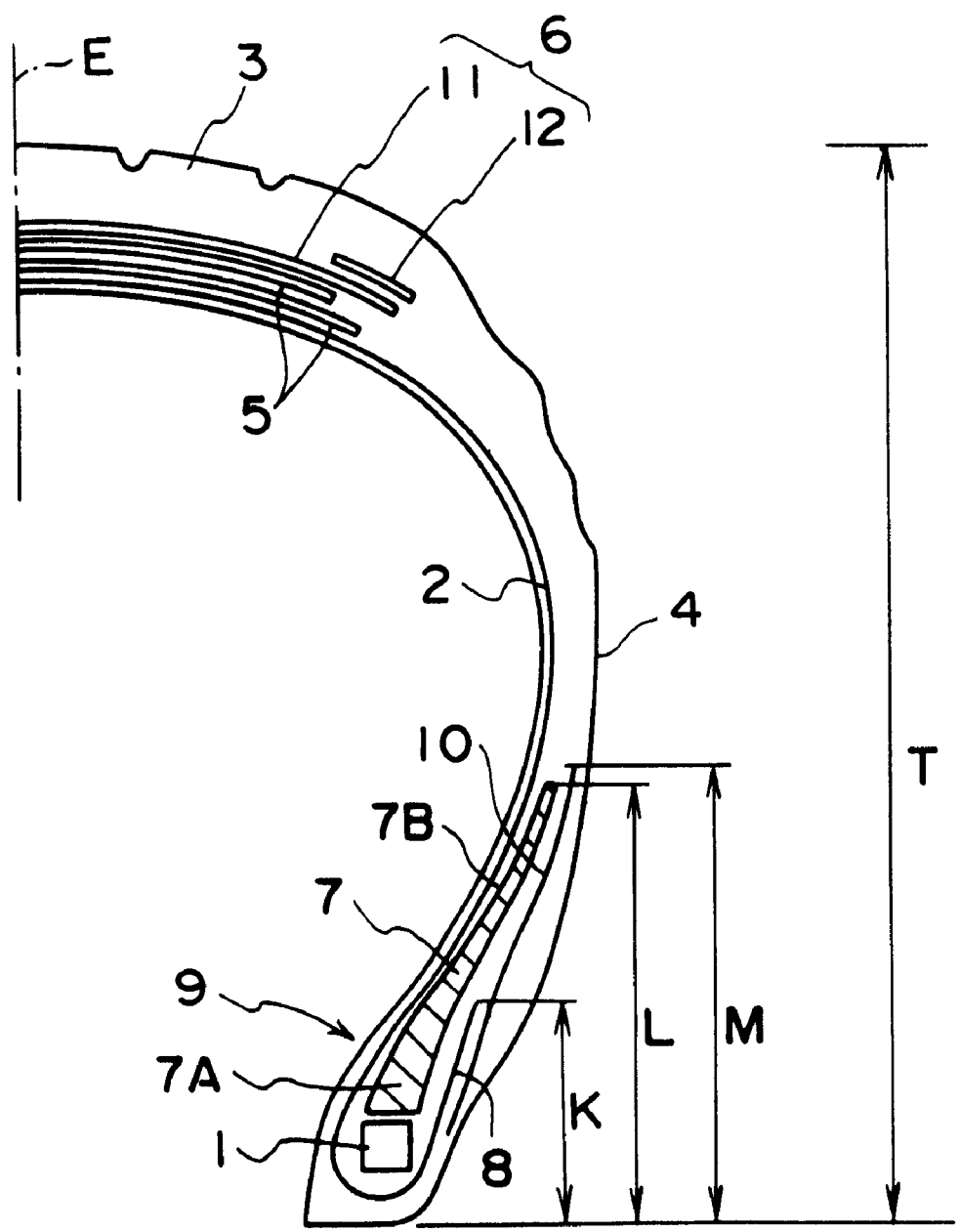
FIG. 1 is a semi-cross sectional view of a pneumatic radial tire according to an embodiment of the present invention.

FIG. 1 is a semi-cross sectional view illustrating a pneumatic radial tire for a passenger car in a widthwise direction thereof according to a first embodiment of the present invention. In this figure, a tire has a carcass 2, the distal ends of which are folded back axially about a pair of bead cores 1 from the inside of a tire to the outside thereof, a tread portion 3 which is disposed at the crown portion of the carcass 2, a pair of side wall portions 4, a belt layer 5 made of at least two layers disposed inwardly from the tread portion 3 in the radial direction thereof, and a belt reinforcing layer 6 made of at least one layer disposed outwardly from the belt layer 5 at positions corresponding to the entire tread portion 3 and/or the end portions thereof. The belt reinforcing layer is formed by spirally winding a rubber-coated narrow strip made of a single fiber cord or a plurality of fiber cords around a tire such that the fiber cord/cords are provided substantially in parallel to the circumferential direction of the tire. A pair of bead fillers 7 are disposed directly above the bead cores 1, respectively. The carcass 2 is formed by disposing fiber cords typically made of rayon in a direction substantially orthogonal to the circumferential direction of a tire, and is formed of at least one layer. The belt layer 5 is formed by non-elongation cords typically made of aromatic-series polyamide fiber or steel cord, which are disposed to be inclined at the angle 10° to 30° with respect to the circumferential direction of a tire (i.e., the equatorial direction of a tire) in a state in which at least two non-elongation cords overlap one another and intersect with each other in different directions thereof.

Each of the bead fillers 7 is interposed between the carcass body and a carcass folding portion 8, of the carcass 2. A base portion 7A of the bead filler 7 is tapered from a portion directly above the bead core 1 to form a substantially triangular cross section. A region 7B of the bead filler 7 has a substantially constant cross sectional width and extends from the upper portion of the base portion 7A to the upper end portion of the bead filler 7. The height L from the bottom surface of a bead portion 9 to the upper end portion of the bead filler 7 referred to as "bead filler height" corresponds to 20 to 60% of the height T from the bead portion bottom surface to the upper end portion of the tread portion 3 (referred to as "tire cross sectional height"). In this case, the height K from the bead portion bottom surface to the upper end portion of the carcass folding portion (referred to as carcass folding portion height") corresponds to 15 to 40% of the tire cross sectional height T, and is shorter than the bead filler height L. The hardness of rubber for a bead filler has 76 to 99 degrees at a type-A durometer hardness, described in JISK6253-1993.

A bead reinforcing layer 10 is disposed outwardly from the carcass folding portion in the widthwise direction of a tire such that steel cords forming the bead reinforcing layer are inclined at the angle of 10° to 60° with respect to the radial direction of a tire. The height M from the bead portion bottom surface to the upper end portion of the bead reinforcing layer 10 (referred to as "bead reinforcing layer height") corresponds to 20 to 60% of the tire cross sectional height T, and is shorter than the bead filler height L.

An example of the belt reinforcing layer 6 is shown in FIG. 1 in which the belt reinforcing layer 6 comprises a first belt reinforcing layer 11 which is wound around the belt layer 5 at the outer circumferential direction thereof over the portions corresponding to the entire tread portion 3, and a second belt reinforcing layer 12 which is wound around the end portions of the first belt reinforcing layer 11 at the outer circumferential direction thereof. Other examples of the belt reinforcing layer 6 in which the first belt reinforcing layer 11 may be formed by one layer or two layers, and the first belt reinforcing layer 11 may be combined with the second belt reinforcing layer 12 having one layer or two layers can be applied to the present invention.

The belt reinforcing layer 6 is made of organic fiber cords. It is preferable that the organic fiber cords have an elongation of 1.8% or less under load of 1.4 g/d at the temperature of 50±5° C., and have a 2.0 to 3.0% elongation under load of 0.7 g/d at the temperature of 170±5° C. In the present embodiment, the belt reinforcing layer 6 is spirally wound around a tire. However, a method in which side portions of a narrow strip are butted, portions of the strip are overlapped one another, or an interval is provided between the strips adjacent to each other can be applied to the present invention.

Figure 2:
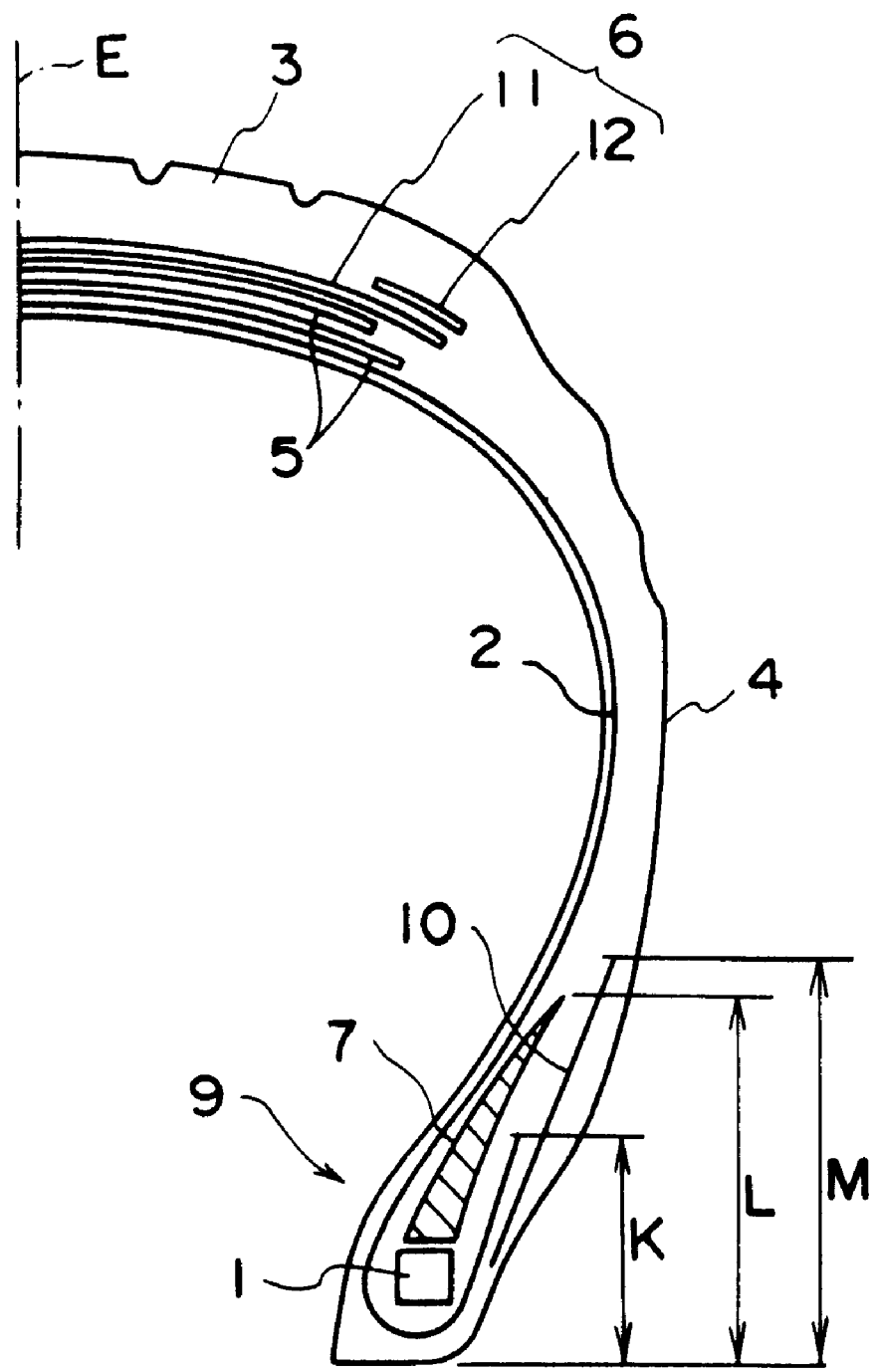
FIG. 2 is a semi-cross sectional view of a pneumatic radial tire according to another embodiment of the present invention.

FIG. 2 shows another embodiment of the present invention. In the present embodiment, an example is described in which the bead filler 7 is tapered from the bottom surface to the upper end portion of a filler to be substantially uniform. Since other structures are the same as those of the first embodiment, a description therefor will be omitted.

In accordance with Table 1, a tire was experimentally manufactured in which a tire size is 225/60R16 and a rim size is 7JJ. According to Table 2, a layer of PEN cords was disposed on a cap 11 and a layer 12 of the tire according to the present invention. Respective sizes of portions of the bead filler 7 in FIG. 1 is such that the bead filler height is 45 mm, the filler bottom surface width is 6 mm, and the filler base portion height is 25 mm. The hardness of rubber for the bead filler is 98 degrees at the hardness of a type-A durometer which is described in J15K6253-1993. A layer of the bead reinforcing layer 10 is disposed outwardly from the carcass folding portion so that steel cords are inclined at the angle 220 with respect to the radial direction of the tire. In tires according to conventional/comparative/present examples, structures which are not shown in Table 2 are the same.

The experimentally manufactured tire is assembled in a rim of a size 7JJ with an internal pressure 2.0 kgf/cm$^2$, and is installed at a 4000 cc class of a domestic passenger car, and the vehicle interior noise of the car and the stability and controllability thereof were evaluated.

(1) Vehicle interior noise:
Noise level db (A) was metered at the interior of a vehicle at the traveling speed of 60 km/h.

(2) Stability and controllability:
The feeling test was effected by a test driver using test cords and the test includes a zigzag traveling test and a high-speed cornering test in test cords. When the tire according to the present invention is superior to the conventional tire, +1 is marked. When the tire according to the invention is inferior to a conventional tire, −1 is marked. When the inferiority and/or superiority of the present tire to a conventional tire are evaluated extremely apparently, ±2 is marked.

TABLE 1

| cord material | PEN | nylon | alamido |
| --- | --- | --- | --- |
| denier | 1500/2 | 1260/2 | 1500/2 |
| elongation (%) under load of 1.4 g/d, 50 ± 5° C. | 1.3 | 4.2 | 1.2 |
| elongation (%) under load of 0.7/d, 170 ± 5° C. | 2.2 | 4.5 | 0.8 |

TABLE 2

| | cap/ layer quality | bead filler | | bead reinforcing layer | | | interior noise | stability & controllability |
| --- | --- | --- | --- | --- | --- | --- | --- | --- |
| | | height L | configuration | height M | angle | carcass quality | | |
| conventional example | nylon | 18% | — | — | — | polyester | 62.1 dBA | 0 |
| comparative example 1 | PEN | 18% | — | — | — | polyester | 61.3 dBA | 0 |
| comparative example 2 | nylon | 33% | FIG. 2 | — | — | polyester | 63.8 dBA | +1.0 |

TABLE 2-continued

| | cap/ layer quality | bead filler | | bead reinforcing layer | | carcass quality | interior noise | stability & controllability |
|---|---|---|---|---|---|---|---|---|
| | | height L | configuration | height M | angle | | | |
| example 1 | PEN | 33% | FIG. 1 | — | — | polyester | 60.4 dBA | +1.0 |
| example 2 | PEN | 33% | FIG. 1 | 40% | 22° | polyester | 60.8 dBA | +1.5 |
| example 3 | PEN | 33% | FIG. 1 | 40% | 22° | rayon | 59.0 dBA | +2.5 |
| example 4 | PEN | 33% | FIG. 2 | 40% | 22° | polyester | 61.3 dBA | +1.0 |

According to Table 1, in a tire of the present invention in which PEN cords are used for the cap 11 and the layer 12, and the height of the bead filler is 20% or more of the cross sectional height of the tire, it should be noted that the stability and controllability increase as well as a larger amount of the noise at the interior of a vehicle decreases. In the case where bead filler 7 has the configuration which is shown in FIG. 1, it is especially noticeable that the reduction of a noise at the interior of the vehicle and the stability and controllability are remarkably improved. When the bead reinforcing layer 10 is provided in addition, stability and controllability can be further improved. When a rayon cord is applied to a carcass, a larger amount of the vehicle interior noise can be reduced and very few faint vibration can be caused.

In accordance with a pneumatic radial tire of the present invention, since an excellent stability and controllability can be obtained, a road noise can be decreased.

While the embodiments of the present invention, as herein described, constitute a preferred form, it is to be understood that other forms might be adopted.

What is claimed is:

1. A pneumatic radial tire, comprising:

a pair of bead portions;

a carcass having a toroid-shaped configuration and extending over said bead portions;

a tread portion which is positioned at the crown portion of said carcass; and a pair of side wall portions, in which at least two belt layers are disposed inwardly from said tread portion, at least one belt reinforcing layer is disposed outwardly from said belt layer in the radial direction thereof at positions corresponding to the whole portion and/or the end portions of said tread portion, said at least one belt reinforcing layer is formed by spirally winding a rubber-coated and narrow strip made of a single fiber cord or a plurality of fiber cords around said tire such that each fiber cord is provided substantially in parallel to the circumferential direction of the tire, and a pair of bead fillers is disposed directly above bead cores of said pair of said bead portions, respectively, wherein each of said fiber cord of said at least one belt reinforcing layer is an organic fiber cord, each of said fiber cord has an elongation of 2.7% or less under a load of 1.4 g/d at the temperature of 50±5° C., and has an elongation of 1.5 to 6.0% under a load of 0.7 g/d at the temperature of 170±5° C., the height of each of said bead fillers is equal to 20 to 60% of the cross sectional height of said tire, each of said bead fillers is interposed between a carcass body and a carcass folding portionm of said carcass, a base portion of said bead fillers disposed directly above each of said bead cores is tapered outwardly in the radial direction of said tire, and each of said bead fillers extends at a substantially constant cross sectional width from the upper end portion of said base portion to the distal end portion of said bead filler, a bead reinforcing layer is disposed at each said carcass folding portion outwardly in the widthwise direction of said tire such that the direction of the cords forming said bead reinforcing layer incline at the angle of 10° to 60° with respect to the radial direction of said tire, and wherein a height of said bead reinforcing layer is equal to 20 to 60% of said tire cross sectional height.

2. A pneumatic radial tire according to claim 1, wherein a height of said bead reinforcing layer is higher than the bead filler height.

3. A pneumatic radial tire according to claim 1, wherein a height of said carcass folding portion is equal to 15 to 40% of said tire cross sectional height, and is lower than the bead filler height.

4. A pneumatic radial tire according to claim 1, wherein each of said fiber cord has a 1.8% or less elongation under a load of 1.4 g/d at the temperature of 50±5° C., and has a 2.0 to 3.0% elongation under a load of 0.7 g/d at the temperature of 170±5° C.

5. A pneumatic radial tire according to claim 1, wherein each of said organic fiber cord has a slope N1 of a tangent of its stress-elongation curve indicated under a load of 1.4 g/d at the temperature of 50±5° C., and has a slope N2 of a tangent thereof under a load of 0.25 g/d at the same temperature, the ratio of N1 to N2 being 0.8 to 1.3.

6. A pneumatic radial tire according to claim 1, wherein each of said fiber is a cord in which more than 30% of the total denier is made of polyethylene-2, 6-napthalate fiber.

7. A pneumatic radial tire according to claim 1, wherein said fiber cord is made of polyethylene terephthalate fiber.

8. A pneumatic radial tire according to claim 1, wherein each of said belt layer is made of steel cords.

* * * * *